(12) United States Patent
Su et al.

(10) Patent No.: US 8,958,508 B2
(45) Date of Patent: Feb. 17, 2015

(54) METHOD AND SYSTEM FOR MEASURING BACKGROUND NOISE OF MACHINE

(75) Inventors: Xiaoming Su, Shenzhen (CN); Yujie Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 110 days.

(21) Appl. No.: 13/258,015

(22) PCT Filed: Jun. 9, 2010

(86) PCT No.: PCT/CN2010/073694
§ 371 (c)(1),
(2), (4) Date: May 22, 2012

(87) PCT Pub. No.: WO2011/113231
PCT Pub. Date: Sep. 22, 2011

(65) Prior Publication Data
US 2012/0329466 A1   Dec. 27, 2012

(30) Foreign Application Priority Data

Mar. 15, 2010 (CN) .......................... 2010 1 0127487

(51) Int. Cl.
*H03D 1/04* (2006.01)
*H04B 17/00* (2006.01)
*H04L 5/00* (2006.01)

(52) U.S. Cl.
CPC .......... *H04B 17/0055* (2013.01); *H04L 5/0073* (2013.01); *H04B 17/007* (2013.01); *H04L 5/0007* (2013.01)
USPC ........... 375/346; 375/267; 375/278; 375/284; 375/343

(58) Field of Classification Search
CPC ... H04L 1/0003; H04L 1/0071; H04L 5/0007; H04L 1/0009; H04L 27/0008; H04L 27/2647; H04L 27/2657; H04L 27/2662; H04L 5/0048; H04L 17/0055; H04L 5/0073; H04B 17/007
USPC .......................... 375/346, 267, 278, 284, 343; 455/67.13, 450
See application file for complete search history.

(56) References Cited

U.S. PATENT DOCUMENTS 8,483,737 B2 * 7/2013 Englund et al. ................ 455/509
2010/0329466 A1   12/2010 Berge

FOREIGN PATENT DOCUMENTS

| CN | 1671070 A | 9/2005 | |
|---|---|---|---|
| CN | 1996766 A | 7/2007 | |
| CN | 101426212 A | 5/2009 | |
| WO | WO 2009/026561 | * 2/2009 | ............. H04B 15/00 |

OTHER PUBLICATIONS

International Search Report for PCT/CN2010/073694 dated Dec. 2, 2010.

* cited by examiner

*Primary Examiner* — Dhaval Patel
(74) *Attorney, Agent, or Firm* — Ling Wu; Stephen Yang; Ling and Yang Intellectual Property

(57) ABSTRACT

A method and system for measuring noise of a machine are disclosed by the present invention, and the method includes: acquiring a first noise interference set, searching for noise interferences which are less than a preset noise interference threshold from the first noise interference set to obtain a second noise interference set, and then calculating an average value of the second noise interference set; and determining whether the average value of the second noise interference set is less than or equal to a set threshold, and if the average value of the second noise interference set is less than or equal to the set threshold, the current noise of the machine is equal to the average value of the second noise interference set. With the present invention, a more accurate measurement value of the noise of the machine can be obtained.

14 Claims, 2 Drawing Sheets

METHOD AND SYSTEM FOR MEASURING BACKGROUND NOISE OF MACHINE

TECHNICAL FIELD

The present invention relates to the field of wireless network technologies, and more specifically, to a method and system for measuring noise of a machine.

BACKGROUND OF THE RELATED ART

The Long Term Evolution (LTE) project is the 3 G evolution, and it improves and strengthens the 3 G air access technology, uses the Orthogonal Frequency Division Multiplexing (OFDM) and the Multiple-Input Multiple-Out-put (MIMO) as a sole criterion of its wireless network evolution. Peak rates of 326 Mbit/s in downlink and 86 Mbits/s in uplink can be provided in the 20 MHz spectrum bandwidth, and the LTE improves the performance of users at cell edges, improves the cell capacity and reduces the system delay.

The LTE system uses the inter-cell interference suppression technique to improve the data rate at cell edges. Currently, the inter-cell interference technologies mainly comprise Inter Cell Interference Coordination (ICIC), Inter Cell Interference Randomization (ICIR), Inter Cell Interference Cancellation (ICICc) and slow power control, and so on. In the ICIC scheme, the network layer needs to understand the Interference Over Thermal (IOT) in frequencies, and determines whether there is an interference and how the interference strength is by a determination threshold, and then avoids the occurrence of interferences by coordination between base stations as much as possible, wherein the IOT is defined as follows:

$$IOT = NI/N \quad (1)$$

where, N is noise of a machine, and NI is a noise interference.

The LTE protocol needs to measure the noise interference power of each resource block and the noise of the machine.

An algorithm for measuring the noise of the machine in the related art uses the following formula for calculation:

$$P_{Thermal} = KTB + \text{noise figure} \quad (2)$$

where, KTB represents the noise, K is the Boltzmann constant, T is a reference temperature (Kelvin), and B is an effective noise broadband of a receiver. In the case of a fixed bandwidth, the value in the algorithm changes with the temperature, the receiver is unable to accurately know the outside temperature, and in the case of a large temperature variation, the algorithm has the problem of measurement inaccuracy.

Another algorithm for measuring the noise of the machine in the related art is to use frequency-domain resources that are not used by users to measure the noise late at night when there are fewer users to access. The algorithm has significant limitations, and needs to determine whether the users are few at this moment artificially.

SUMMARY OF THE INVENTION

The main purpose of the present invention is to provide a method and system for measuring noise of a machine, and the measurement is accurate.

The technical scheme used by the present invention is: a method for measuring noise of a machine, comprising:

acquiring a first noise interference set, searching for noise interferences which are less than a preset noise interference threshold from the first noise interference set to obtain a second noise interference set, and then calculating an average value of the second noise interference set; and determining whether the average value of the second noise interference set is less than or equal to a set threshold, and if the average value of the second noise interference set is less than or equal to the set threshold, the current noise of the machine is equal to the average value of the second noise interference set.

Preferably, the method further comprises: searching for a minimum noise interference from the first noise interference set, and setting a value which is integer times of the minimum noise interference as the preset noise interference threshold.

Preferably, a number of noise interferences in the first noise interference set is equal to a number of uplink resource blocks in a LTE system.

Preferably, the set threshold is equal to an absolute value of a sum of both a correction value of the noise of the machine and a reference noise of the machine, and the reference noise of the machine is equal to an average value of noise interferences of the uplink resource blocks in the LTE system in the case of a room temperature as well as no interference.

Preferably, the correction value of the noise of the machine is ½ of the reference noise of the machine.

Preferably, the method further comprises:

if the average value of the second noise interference set is greater than the set threshold, the current noise of the machine is equal to the reference noise of the machine.

A system for measuring noise of a machine, comprising:

an acquiring unit, configured to acquire a first noise interference set;

a searching unit, connected with the acquiring unit and configured to search for noise interferences which are less than a preset noise interference threshold from the first noise interference set to obtain a second noise interference set;

a calculation unit, connected with the searching unit and configured to calculate an average value of the second noise interference set; and a determination unit, configured to determine whether the average value of the second noise interference set is less than or equal to the set threshold if the average value of the second noise interference set is less than or equal to the set threshold, the current noise of the machine is equal to the average value of the second noise interference set.

Preferably, the searching unit is further configured to search for a minimum noise interference from the first noise interference set, and set a value which is integer times of the minimum noise interference as the preset noise interference threshold.

Preferably, a number of noise interference values in the first noise interference set is equal to a number of uplink resource blocks in a LTE system.

Preferably, the set threshold is equal to an absolute value of a sum of both a correction value of the noise of the machine and a reference noise of the machine, and the reference noise of the machine is equal to an average value of noise interferences of the uplink resource blocks in the LTE system in the case of a room temperature as well as no interference.

Preferably, the correction value of the noise of the machine is ½ of the reference noise of the machine.

Preferably, the determination unit is further configured to: if the average value of the second noise interference set is greater than the set threshold, the current noise of the machine is equal to the reference noise of the machine.

Compared with the related art, the present invention obtains the second noise interference set by searching for the noise interferences which are less than the preset noise interference threshold in the first noise interference set and calculates the average value of the second noise interference set, and when the average value is less than or equal to the set threshold, it can be determined that the current noise of the machine is the average value. This method can obtain a more accurate measurement value of the noise of the machine and overcome the problem in the related art that the measurement by the fixed measurement method being inaccurate results from a change of the noise of the machine due to a change of the temperature.

PREFERRED EMBODIMENTS OF THE PRESENT INVENTION

The present invention will be described in further detail by examples and in conjunction with accompanying drawings hereinafter.

Figure 1:
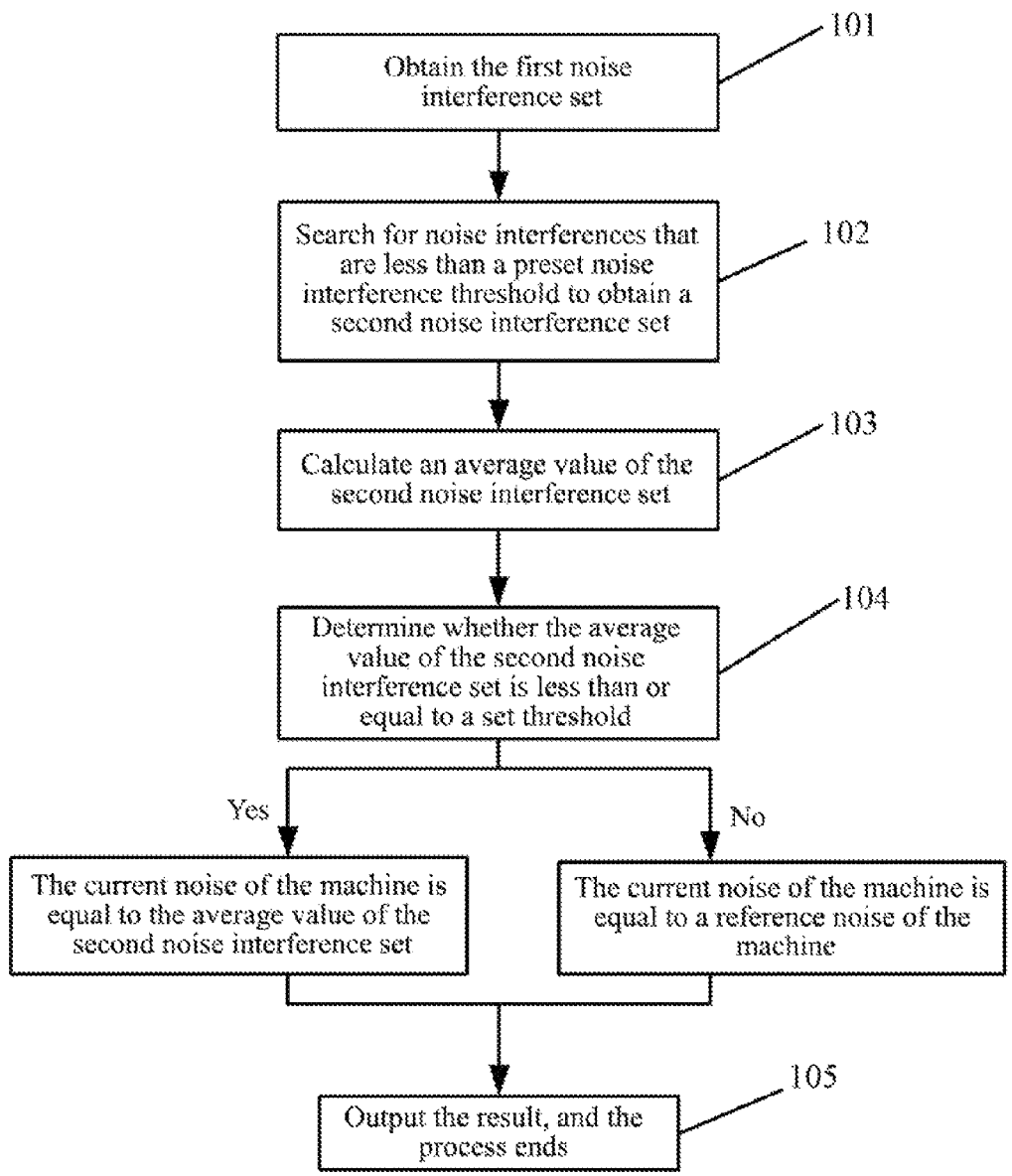
FIG. 1 is a flow chart of a method for measuring noise of a machine provided in the present invention.

With reference to FIG. 1, FIG. 1 is a flow chart of a method for measuring noise of a machine provided in the present invention, comprising the following steps.

In step 101, a base station measures a noise interference on each Resource Block (RB) to obtain a first noise interference set A.

In a LTE system, the first noise interference set A measured by a receiver is set as:

$$A=\{NI_k, k=1,2,\ldots \lambda\}$$

where $\lambda$ is a number of resource blocks. In the LTE system, if the uplink is 5 M, there will be a total of 25 resource blocks, and the Noise Interferences (NIs) in the 25 resource blocks are measured to obtain the first noise interference set A containing 25 elements.

In step 102, noise interferences which are less than a preset noise interference threshold is searched for in the first noise interference set A to obtain a second noise interference set $$B=\{NI_k | NI_k < \alpha\rho, k=1,2\ldots \lambda\}.$$

In the present embodiment, the preset noise interference threshold is determined as follows: a minimum noise interference being searched for from the first noise interference set and the minimum noise interference being set as $\alpha$, and a value which is integer times of the minimum noise interference being set as the preset noise interference threshold. The method for searching for a minimum noise interference comprises a fast search method, a binsearch method, and so on, and the search technology is an existing technology and is not discussed here.

Wherein, $\rho$ is a scale factor, which is configured differently under different conditions of the receiver, and is related to a room temperature, and in normal circumstances, $\rho$ is generally an integer, and preferably is equal to 2.

In step 103, an average value $\chi$ of the second noise interference set B is calculated.

In step 104, whether the average value $\chi$ of the second noise interference set B is less than or equal to the set threshold is determined, if the average value $\chi$ of the second noise interference set B is less than or equal to the set threshold, the current noise of the machine is equal to the average value $\chi$ of the second noise interference set B; otherwise, if the average value of the second noise interference set is greater than the set threshold, the current noise of the machine is equal to a reference noise of the machine.

The set threshold is equal to an absolute value of a sum of both a correction value of the noise of the machine and a reference noise of the machine, and the reference noise of the machine is equal to an average value of noise interferences of uplink resource blocks in the LTE system in the case of a room temperature as well as no interference. In the present embodiment, in the case of the room temperature and no interference, the noise interferences of the uplink resource blocks in the LTE system are measured by the receiver, and then these noise interferences are averaged to obtain the reference noise of the machine.

In step 105, after the measured noise of the machine is output, the process ends.

In the present embodiment, under normal circumstances, the correction value of the noise of the machine is ½ of the reference noise of the machine.

The reference noise of the machine is set as $\zeta$, the correction value of the noise of the machine is set as $\epsilon$, and under normal circumstances, $\epsilon=\zeta/2$, then the set threshold is $|\zeta+\epsilon|$. If the average value of the second noise interference set B is $\chi \leq |\zeta+\epsilon|$, the current noise of the machine is equal to $\chi$; otherwise, if the average value of the second noise interference set B is $\chi > |\zeta+\epsilon|$, the current noise of the machine is equal to the reference noise of the machine $\zeta$.

The aforementioned method for measuring noise of a machine overcomes the problem in the related art that the measurement by the fixed measurement method being inaccurate results from a change of the noise of the machine due to a change of the temperature.

Meanwhile, it also solves the problem that in a particular environment, the noise of the machine measured by the receiver cannot characterize the noise of the machine under normal circumstances.

The present invention will be described in detail by specific data hereinafter.

Embodiment One it is assumed that that in a LTE system, the uplink bandwidth is 5 M, and there are a total of 25 resource blocks. In the case of a room temperature and no interference, measurement results of noise interferences (NIs) of the 25 resource blocks are averaged to obtain a reference value $\zeta=1120$.

In step A1, the base station measures a noise interference on each Resource Block (RB) to obtain a first noise interference set A, and if the obtained first noise interference set A={2228, 2328, 2845, 2928, 3228, 4129, 4228, 4321, 5222, 6527, 4123, 4424, 4525, 5428, 6422, 6726, 1108, 1258, 1144, 3455, 4529, 4678, 4988, 5038, 5618}, the aforementioned results are measured within the base station and are measured by a physical layer, and the data is the quantized results.

In step A2, a minimum noise interference a in the 25 elements of the first noise interference set is searched for, and the minimum noise interference in the present embodiment is $\alpha=1108$.

In step A3, take $\rho=2$ for example, values which are less than 2 times of the minimum noise interference $\alpha$, that is 1108×2=2216, are searched for in the 25 elements of the first noise interference set A to obtain the second noise interference set B={1108, 1258, 1144}.

In step A4, an average value of the second noise interference set B={1108, 1258, 1144} is calculated, i.e., $\chi=(1108+1258+1145)/3=1170$.

In step A5, whether $\chi=1170<|\zeta+\epsilon|=|1120+560|=1680$ is determined, and when the current result is within a change range of the noise of the machine, the current noise of the machine is equal to χ=1170, and after the noise of the machine is output, the process ends.

Embodiment Two it is assumed that in a LTE system, the uplink bandwidth is 5 M, and there are a total of 25 resource blocks. In the case of a room temperature and no interference, measurement results of noise interferences (NIs) of the 25 resource blocks are averaged to obtain a reference value ζ=1120.

In step B1, the base station measures the noise interference on each radio bearer RB to obtain a first noise interference set A', if the obtained first noise interference set A'={5228, 5328, 16845, 5448, 5278, 5159, 5268, 5351, 5275, 16527, 5123, 15424, 17525, 17428, 17422, 16726, 17108, 17258, 17144, 17455, 17529, 17678, 19988, 18038, 18618}, the aforementioned results are measured within the base station and are measured by a physical layer, and data is the quantized results.

In step B2, a minimum noise interference a' is searched for in the 25 elements of the first noise interference set A', and the minimum noise interference a' is a'=5123 in the present embodiment.

In step B3, take ρ=2 for example, values which are less than 2 times of the minimum noise interference α', that is 5123×2=10246 are searched for in the 25 elements of the first noise interference set A' to obtain the second noise interference set B'={5228, 5328, 5448, 5278, 5159, 5268, 5351, 5275, 5123}.

In step B4, an average value of the set B'={5228, 5328, 5448, 5278, 5159, 5268, 5351, 5275, 5123} is calculated to obtain χ'=5273.

In step B5, whether χ'=5273>|ζ+ϵ|=|1120+560|=1680 is determined, and when the current result is outside a change range of the noise of the machine, it means that the measurement result has an interference, and the current calculation result is invalid, and the current noise of the machine is equal to 1120, and after the noise of the machine is output, the process ends.

Figure 2:
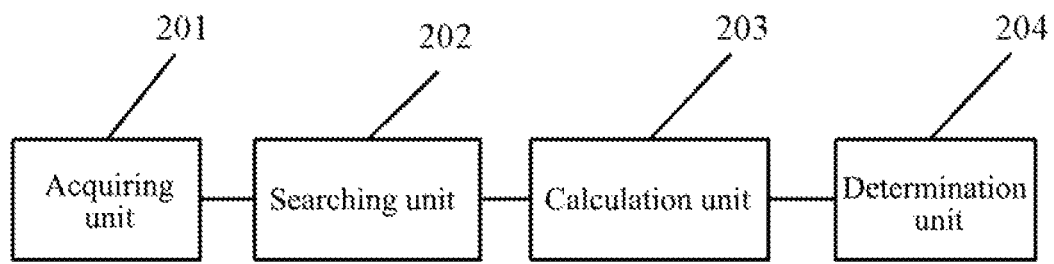
FIG. 2 is a block diagram of a system for measuring noise of a machine provided in the present invention.

Please refer to the illustration shown in FIG. 2, the present embodiment further provides a system for measuring noise of a machine, comprising the following units.

An acquiring unit 201 is configured to acquire a first noise interference set.

A searching unit 202 is connected with the acquiring unit 201 and configured to search for noise interferences which are less than a preset noise interference threshold from the first noise interference set to obtain a second noise interference set;

The searching unit 202 searches for a minimum noise interference from the first noise interference set and sets a value which is integer times of the minimum noise interference as the preset noise interference threshold.

Preferably, the time is 2.

A calculation unit 203 is connected with the searching unit and is configured to calculate an average value of the second noise interference set.

A determination unit 204 is configured to determine whether the average value of the second noise interference set is less than or equal to the set threshold, if the average value of the second noise interference set is less than or equal to the set threshold, the current noise of the machine is equal to the average value of the second noise interference set.

Preferably, the set threshold is equal to an absolute value of a sum of both a correction value of the noise of the machine and a reference noise of the machine, and the reference noise of the machine is equal to an average of noise interferences of uplink resource blocks in a LTE system in the case of a room temperature and no interference. The correction value of the noise of the machine is ½ of the reference noise of the machine.

Preferably, in the present embodiment, a number of noise interference values in the first noise interference set is equal to a number of the uplink resource blocks in the LTE system.

Furthermore, the determination unit 204 is further configured to: if the average value of the second noise interference set is greater than the set threshold, the current noise of the machine is equal to the reference noise of the machine.

The system for measuring noise of a machine provided in the aforementioned embodiment overcomes the problem in the related art that the measurement by the fixed measurement method being inaccurate results from a change of noise of the machine due to a change of the temperature.

Meanwhile, it also solves the problem that in a particular environment, the noise of the machine measured by the receiver cannot characterize the noise of the machine under normal circumstances.

The above contents are further specific descriptions which are made on the present invention in conjunction with the specific preferred embodiments; however, the specific implementation of the present invention cannot be considered as only being limited to these descriptions. For those of ordinary skill in the technical field to which the present invention belongs, on the premise of not departing from the concept of the present invention, a number of simple deductions or substitutions can also be made, all of which should be construed as belonging to the protection scope of the present invention.

INDUSTRIAL APPLICABILITY

The present invention can obtain a more accurate measurement value of the noise of the machine, and overcomes the problem in the related art that the measurement by the fixed measurement method being inaccurate results from a change of noise of the machine due to a change of the temperature.

What we claim is:

1. A method for measuring noise of a machine, comprising:
  acquiring a first noise interference set, searching for noise interferences which are less than a preset noise interference threshold from the first noise interference set to obtain a second noise interference set, and then calculating an average value of the second noise interference set; and
  determining whether the average value of the second noise interference set is less than or equal to a set threshold, and if the average value of the second noise interference set is less than or equal to the set threshold, current noise of the machine is equal to the average value of the second noise interference set; and
  further comprising: searching for a minimum noise interference from the first noise interference set, and setting a value which is integer times of the minimum noise interference as the preset noise interference threshold.

2. The method of claim 1, wherein, a number of noise interferences in the first noise interference set is equal to a number of uplink resource blocks in a Long Term Evolution (LTE) system.

3. The method of claim 1, wherein, the set threshold is equal to an absolute value of a sum of a correction value of the noise of the machine and a reference noise of the machine, and the reference noise of the machine is equal to an average value of noise interferences of the uplink resource blocks in the LTE system in a case of room temperature as well as no interference.

4. The method of claim 3, wherein, the correction value of the noise of the machine is ½ of the reference noise of the machine.

5. The method of claim 1, further comprising:
if the average value of the second noise interference set is greater than the set threshold, the current noise of the machine is equal to a reference noise of the machine which is equal to an average value of noise interferences of the uplink resource blocks in the LTE system in a case of room temperature as well as no interference.

6. The method of claim 2, wherein, the set threshold is equal to an absolute value of a sum of a correction value of the noise of the machine and a reference noise of the machine, and the reference noise of the machine is equal to an average value of noise interferences of the uplink resource blocks in the LTE system in a case of room temperature as well as no interference.

7. The method of claim 6, wherein, the correction value of the noise of the machine is ½ of the reference noise of the machine.

8. The method of claim 2, further comprising:
if the average value of the second noise interference set is greater than the set threshold, the current noise of the machine is equal to a reference noise of the machine which is equal to an average value of noise interferences of the uplink resource blocks in the LTE system in a case of room temperature as well as no interference.

9. A system for measuring noise of a machine, comprising a processor, and a non-transitory storage device for storing computer executable instructions that when executed by the processor cause the processor to perform the steps in following:
acquiring a first noise interference set;
searching for noise interferences which are less than a preset noise interference threshold from the first noise interference set to obtain a second noise interference set;
calculating an average value of the second noise interference set; and
determining whether the average value of the second noise interference set is less than or equal to a set threshold, if the average value of the second noise interference set is less than or equal to the set threshold, current noise of the machine is equal to the average value of the second noise interference set;
wherein, searching step is further comprising searching for a minimum noise interference from the first noise interference set, and setting a value which is integer times of the minimum noise interference as the preset noise interference threshold.

10. The system of claim 9, wherein, a number of noise interference values in the first noise interference set is equal to a number of uplink resource blocks in a LTE system.

11. The system of claim 9, wherein, the set threshold is equal to an absolute value of a sum of a correction value of the noise of the machine and a reference noise of the machine, and the reference noise of the machine is equal to an average value of noise interferences of the uplink resource blocks in the LTE system in a case of room temperature as well as no interference.

12. The system of claim 11, wherein, the correction value of the noise of the machine is ½ of the reference noise of the machine.

13. The system of claim 9, wherein, the determination step further comprising: if the average value of the second noise interference set is greater than the set threshold, the current noise of the machine is equal to a reference noise of the machine which is equal to an average value of noise interferences of the uplink resource blocks in the LTE system in a case of room temperature as well as no interference.

14. The system of claim 10, wherein, the determination step further comprising: if the average value of the second noise interference set is greater than the set threshold, the current noise of the machine is equal to a reference noise of the machine which is equal to an average value of noise interferences of the uplink resource blocks in the LTE system in a case of room temperature as well as no interference.

\* \* \* \* \*